United States Patent Office 2,932,663
Patented Apr. 12, 1960

2,932,663

PROCESS AND CATALYST FOR THE PREPARATION OF VINYL ESTERS

Helmut Kalenda, Marl, Kreis Recklinghausen, Germany, assignor to Chemische Werke Huls Aktiengesellschaft, Recklinghausen, Germany, a corporation of Germany No Drawing. Application May 13, 1958
Serial No. 734,845

Claims priority, application Germany June 4, 1957

2 Claims. (Cl. 260—498)

It is known that activated charcoal impregnated with zinc acetate can be used as catalyst for the vinylation of acetic acid. Such a catalyst however has the drawback that the zinc acetate contained in the activated charcoal after the impregnation contains water of crystallization, which can be removed only with difficulty by drying. In order for the vinylation reaction to be started the catalyst must be completely anhydrous. Moreover, the zinc acetate is volatile at the temperature required for the execution of the vinylation reaction, which generally lies between 180° C. and 240° C., so that the catalyst becomes impoverished in zinc acetate after a relatively short time and loses its effectiveness.

The present invention therefore deals with the vinylation of aliphatic carboxylic acids of the group comprising acetic acid, propionic acid, butyric acid, valeric acid, caproic acid and methyl caproic acid in the presence of activated charcoal impregnated with a zinc salt of an aliphatic dibasic carboxylic acid, as the catalyst; the procedure for the vinylation of aliphatic carboxylic acids is well known and need not be described in detail. Suitable zinc salts are, for example, those of malonic acid, succinic acid, glutaric acid, adipic acid, pimelic acid, suberic acid as well as azelaic and sebacic acid. The catalyst may be prepared by first impregnating the activated charcoal with an aqueous zinc chloride solution, drying the resulting zinc chloride containing activated charcoal and introducing it into a dilute, for example 10 to 20% aqueous solution of an alkali metal salt of an aliphatic dicarboxylic acid. After drying again the catalyst generally contains from 2 to 12% of zinc. This mass may be washed with distilled water and dried again.

Such a catalyst shows a many times longer life time at 180°–250° C. than a zinc acetate catalyst of the same initial activity.

The invention is illustrated and further disclosed by the following specific examples.

*Example 1*

The preparation of a catalyst for the preparation of vinyl acetate by the fluid bed procedure is as follows: 1150 gm. of activated charcoal with a grain size of 0.1–0.25 mm. and a bulk density of about 385 gm./liter are suspended in an aqueous zinc chloride solution consisting of 294 gm. of anhydrous zinc chloride in 2 liter of water. The resulting suspension is evaporated to dryness with stirring. Then the drying is continued for four hours at 100 to 110° C. in a drying oven. A solution of sodium adipate is prepared by reacting 302 gm. of adipic acid with 165 gm. of caustic soda in 2 liter of water. Into this sodium adipate solution is gradually introduced the dried, zinc chloride-containing activated charcoal. The resulting mixture is evaporated to dryness again and finally redried for about 2 hours at 150° C. The resulting catalyst which still contains some sodium chloride is washed with distilled water, until the washing water is free of chlorine ions. After a final drying at about 150° C. the catalyst is ready for use. It contains about 8% of zinc.

In an apparatus having a capacity of 6 liter, this catalyst shows four times the useful life of a zinc acetate catalyst with the same zinc concentration. On the average 90 gm. of vinyl acetate per liter of catalyst per hour are prepared at an average temperature of 220° C. to 230° C. during 500 hours operating time.

If the vinylation procedure is to be carried out with the catalyst in a fixed bed the activated charcoal should have a grain size of 3 to 5 mm.

Instead of the solution of the sodium salt (or the potassium salt respectively) of adipic acid the same results can be obtained with a solution of a sodium or potassium salt of malonic, succinic, glutaric, pimelic, suberic, azelaic or sebacic acid for the impregnation of the zinc chloride containing activated charcoal.

*Example 2*

0.6 liter of granulated activated charcoal, impregnated with the zinc salt of the adipic acid prepared as described in Example 1 and which contains about 6.8% of zinc, is filled into a steel tube having length of 1 m. and a diameter of 40 mm. About 50 g. of 2-methyl caproic acid in the form of vapor together with a six molar excess of acetylene per hour are passed through the tube at a temperature of 240° C. The yield of 2-methyl caproic vinyl-ester amounts to about 86% with reference to the 2-methyl caproic acid.

*Example 3*

A solution of 85 g. of the zinc salt of glutaric acid in 600 cu. cm. of aqueous 50% acetic acid is mixed with 255 g. of granulated activated charcoal and evaporated to dryness under continuous agitation. The catalyst so obtained contains about 5.5% of zinc. It was filled into a steel tube as described in Example 2. About 45 g. of 2-methyl caproic acid in the form of vapor together with 50 l. of acetylene per hour are passed through the tube at 220° C. In this case, 75% of the carboxylic acid is transformed into 2-methyl caproic vinyl ester.

*Example 4*

A tube of the dimensions described in Example 2 is filled with 0.6 l. of activated charcoal which is impregnated with the zinc salt of the suberic acid and contains 5.6% of zinc. 60 g. of 2-methyl caproic acid in the form of vapor together with 50 l. of acetylene per hour are passed through the tube at a temperature of 230° C. The 2-methyl caproic vinylester at a yield of 58% in relation to the carboxylic acid was obtained.

*Example 5*

0.6 l. of granulated activated charcoal, impregnated with the zinc salt of the adipic acid as described in Example 1 and which contains about 6% of zinc, is filled in the steel tube as described in Example 2. About 40 g. of propionic acid in the form of vapour together with 50 l. of acetylene per hour are passed through the tube at 240° C. The yield of propionic acid vinylester amounts to about 80% in relation to the propionic acid.

*Example 6*

0.6 l. of granulated activated charcoal, impregnated with the zinc salt of the adipic acid as described in Example 1 and which contains about 7% of zinc are contacted in the steel tube described in Example 2 with 60 g. of butyric acid in the form of vapor and 50 l. of acetylene per hour at 230° C. The yield of butyric acid vinylester amounts to about 75% with reference to the butyric acid.

*Example 7*

0.6 l. of granulated activated charcoal, impregnated with the zinc salt of the glutaric acid according to Example 1 and which contains about 6.5% of zinc are contacted with 50 g. of valeric acid in the form of vapor and 50 l. of acetylene per hour in the steel tube described in Example 2 at 230° C. The yield of valeric acid vinylester amounts to about 63% calculated on the valeric acid.

*Example 8*

0.6 l. of granulated activated charcoal, impregnated with the zinc salt of the adipic acid as described in Example 1 and which contains about 6.8% zinc are contacted in the steel tube described in Example 2 with 65 g. of 1-methyl-pentanic acid in the form of vapor and 50 l. of acetylene per hour at 240° C. 78% of the 1-methyl-pentanic acid vinylester in relation to the 1-methyl-pentanic acid are obtained.

The 1-methyl-pentanic acid referred to above is a compound having the formula

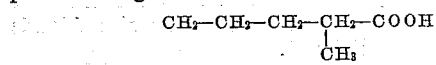

I claim:

1. Process for the vinylation of lower alkanoic acids with from 2 to 7 carbon atoms which comprises contacting said acids and acetylene with activated charcoal impregnated with a zinc salt of an aliphatic dicarboxylic acid selected from the group consisting of malonic acid, succinic acid, glutaric acid, adipic acid, pimelic acid, suberic acid, azelaic acid and sebacic acid at a temperature within the range from 180° C. to 250° C.

2. A catalyst for the vinylation of aliphatic monobasic carboxylic acids comprising activated charcoal impregnated with a zinc salt of an aliphatic dicarboxylic acid selected from the group consisting of malonic acid, succinic acid, glutaric acid, adipic acid, pimelic acid, suberic acid, azelaic acid and sebacic acid.

References Cited in the file of this patent

UNITED STATES PATENTS

| | | |
|---|---|---|
| 1,822,525 | Herrmann | Sept. 8, 1931 |
| 2,066,075 | Reppe | Dec. 29, 1936 |
| 2,452,003 | Weber | Oct. 19, 1948 |
| 2,525,526 | Coover et al. | Oct. 10, 1950 |